United States Patent [19]

Durrieu et al.

[11] 4,173,681

[45] Nov. 6, 1979

[54] BRAKE PAD WITH INTEGRAL ORGANIC BACKPLATE

[75] Inventors: Jean-Pierre Durrieu, Noyon; Guy Pomes, Margny-les-Compiegne, both of France

[73] Assignee: Societe Abex Pagid Equipement S.A., Clichy, France

[21] Appl. No.: 926,050

[22] Filed: Jul. 19, 1978

[30] Foreign Application Priority Data

Jul. 25, 1977 [FR] France ............................ 77 22752

[51] Int. Cl.² .................... F16D 69/02; B32B 19/02; B32B 19/06

[52] U.S. Cl. ............................ 428/409; 188/218 XL; 188/251 A; 428/327; 427/331; 428/404; 428/443; 428/539

[58] Field of Search ........ 188/218 XL, 251 A, 251 R; 428/411, 407–409, 325–329, 331, 404, 443, 539, 492, 500

[56] References Cited

U.S. PATENT DOCUMENTS

| | | |
|---|---|---|
| 2,686,146 | 8/1954 | Gaugue ............................ 428/328 X |
| 3,572,863 | 3/1971 | Josephson ....................... 428/443 X |
| 3,897,582 | 7/1975 | Olcott .............................. 428/408 X |
| 3,956,548 | 5/1976 | Kovac et al. .................... 428/408 X |
| 4,029,829 | 5/1977 | Weaver et al. ................. 428/409 X |
| 4,042,085 | 8/1977 | Bjerk et al. ..................... 428/325 X |
| 4,044,188 | 8/1977 | Segal ............................... 428/409 X |
| 4,098,943 | 7/1978 | Degginger et al. ............ 428/409 X |
| 4,119,591 | 10/1978 | Aldrich ........................... 188/251 A |

FOREIGN PATENT DOCUMENTS 1347812 11/1963 France.

*Primary Examiner*—Harold Ansher
*Attorney, Agent, or Firm*—David A. Greenlee; Thomas S. Baker, Jr.

[57] ABSTRACT

A disc brake pad comprises an organic friction material layer and an organic backplate layer. Both layers are formed of pulverulent materials compacted into "green" preforms at a pressure of 80–150 bars, which are then placed in a mold where heat and pressure are applied to create the integral disc brake pad. Both layers use the same resin and they may even be of identical composition.

4 Claims, 5 Drawing Figures

BRAKE PAD WITH INTEGRAL ORGANIC BACKPLATE

This invention relates generally to disc brake pads and more particularly to such pads having organic friction material.

Conventional disc brake pads are composed of two very distinct materials, i.e., the friction material and the metallic backplate. A metal backplate has several well-defined functions which include giving a general rigidity to the friction material, transmitting the braking torque and mounting the pad in the caliper.

However, pads with metal backplates have certain disadvantages. During brake application, the pad vibrates relative to the disc at high frequencies and, because of the pressure applied by the piston, causes a "squeal". This results from the stress of steel-on-steel contact between the metal backplate and the piston. This noise is quite objectionable.

Also during long braking application and under high braking pressures, the friction material can reach temperatures from 600° to 800° C. The metal backplate conducts heat well and transmits this temperature to the metal caliper piston which causes the brake fluid to boil and turn to vapor. This phenomenon is very serious, because braking pressure declines dramatically.

Automobile disc brakes are quite exposed and are frequently wetted during rainy weather and when traversing puddles of water. The metal backplates, although they are usually protected with different coatings, often become oxidized or corroded. This oxidation often occurs between the friction material and the backplate and can, in some cases, cause separation or delamination of the lining.

Automotive friction materials are usually composed of a high percentage (20-60%) of asbestos, which has good heat resistance and also good mechanical strength. However, environmentalists and others are requiring a reduction or elimination in the use of asbestos in wear parts such as friction material. There has been a great effort to develop friction materials using substitutes for asbestos. Some substitutes used are metallic fibers, carbon fibers, iron powder, cast iron powder. But these products are very heat conductive and do not have the insulating ability of asbestos; this accentuates the phenomenon of oil boiling in the brake cylinder.

In order to eliminate the disadvantage of metallic backplates, organic backplates have been developed which comprise layers of cloth bonded by a resin, as shown in French Pat. No. 1,347,812. These laminated backplates are then bonded to the friction material and have the advantage of decreasing the weight of the pads since the specific gravity of the organic material forming the backplate is only 2. These brake pads are somewhat difficult and expensive to manufacture, since the backplate must first be completely formed and then be trimmed to size before bonding to the friction material.

According to the invention, a pulverulent organic mix is compacted to create a green backplate preform, while a pulverulent organic mix is compacted to create a green friction material preform. These mixes may be identical. The organic material backplate preform and the friction material preform are arranged in a mold and are simultaneously hot pressed at temperatures and pressures suitable to flow the mixes into the mold and to bond the backplate to the friction material.

The pad obtained from this process decreases the phenomenon of oil boiling in the brake system by replacing the heat-conductive metallic backplate with an organic heat-resistant backplate. These pads are also easier and cheaper to make than those using the laminated backplates.

It is to be noted that the composition of the backplate is not necessarily identical with the composition of the friction material, although they use a common resin binder. The simultaneous molding of the backplate and the friction material enables a complete binding between both materials; indeed, the shearing strength of a pad with organic material backplate according to the invention is identical, for the same type of pad, to that of one with metallic backplate.

Other characteristics and advantages of the invention will be better understood by reading the following description of a preferred embodiment, with reference to the enclosed drawings in which.

Figure 1:
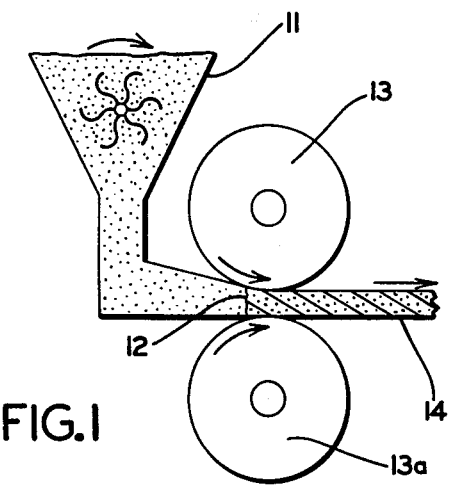
FIG. 1 is a schematic sectional view of a device for compacting a backplate material sheet.

A preform of the organic material backplate is made first. As shown in FIG. 1, the mix of organic material in a pulverulent form is made in a mixer 11 and is directed through an opening 12 between two rollers 13, 13a where it is laminated into a continuous strip 14 of "green" unbaked organic material. This strip 14 is then punched to produce a backing plate preform 19, shown in FIG. 3, ready for molding.

Figure 2:
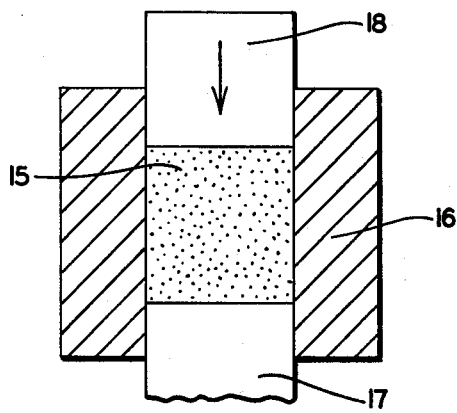
FIG. 2 is a schematic sectional view of an alternate device for pressing a backing plate preform.

Referring now to FIG. 2, it is also possible to produce a preform of the organic material backplate from a pulverulent mix 15 in a mold 16 by cold compression (80-150 bars) between the mold bottom 17 and a piston 18.

In a similar manner, a pulverulent organic material mix is cold compacted to produce a green preform 21 of friction material.

Figure 3:
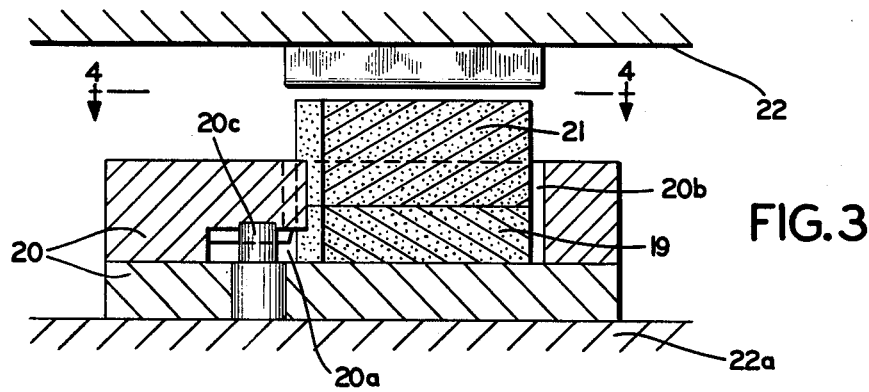
FIG. 3 is a front elevation sectional view of a press and mold, showing the backplate and friction material preforms before pressing.
Figure 4:
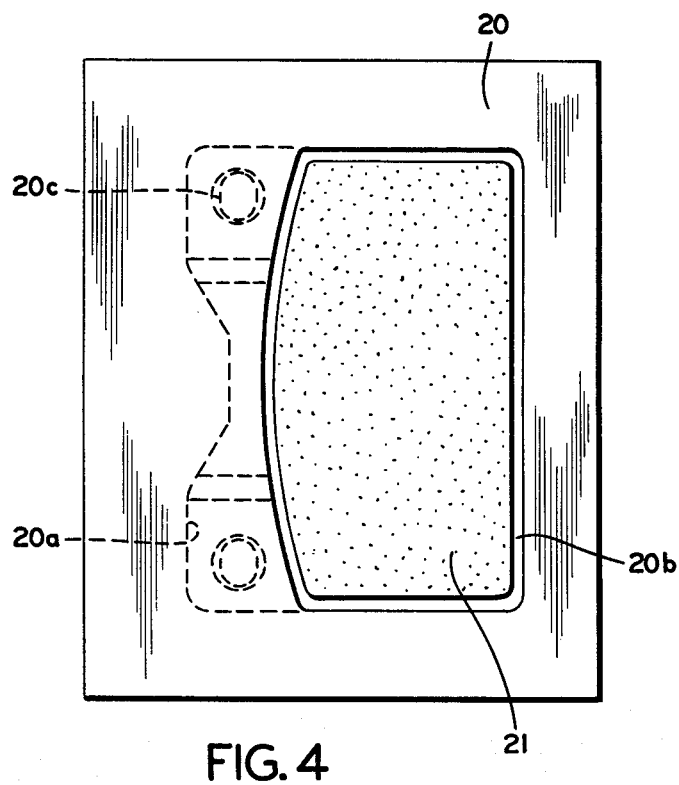
FIG. 4 is a sectional view taken on line 4—4 of FIG. 3.
Figure 5:
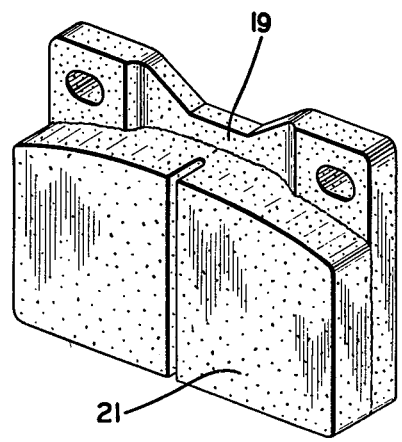
FIG. 5 is a perspective view of the finished disc brake pad of this invention.

Referring now to FIG. 3, the backplate preform 19 is placed in the bottom of mold 20. The friction material preform 21 is then placed over it. The mold 20 comprises a housing 20a corresponding to the finished shape of the backplate and a housing 20b corresponding to the finished shape of the friction material. Housing 20a is provided with cores 20c to create caliper attachment openings 23 in the backplate.

The mold 20 with respective backplates and friction material preforms 19 and 21, is placed between the ram 22 and bed 22a of a press. The preforms 19 and 21 are hot pressed at temperatures, pressures and time conditions suitable for the compositions used.

The friction material may comprise various mixes of organic materials containing the following ingredients:

| BASIC COMPONENTS | % BY WT. |
| --- | --- |
| FIBERS | |
| Asbestos 7D - 5K - 5R grade | |
| Glass fibers, carbon fibers, boron, silica, ceramic | 20-60 |

-continued

| BASIC COMPONENTS | % BY WT. |
|---|---|
| Metallic fibers (Fe, Cu, Al, Zn, Steel) | |
| Textile fibers (natural or synthetic) | |
| RESINS | |
| Formophenolic unmodified or organic modified (oils, rubber) | 0-15 |
| or inorganic (boron, silane, aluminum) | |
| from straight phenol or substituted phenols (cresols, xylenols) | |
| Formol urea, melamine, other nitrogenous by-products | |
| Resins from aldehydes other than formol (furfural, benzaldehyde, croton-aldehyde) | |
| Thermostable resins other than phenolic (polyimide, polyesterimide, polyamide-imide, polybenzimidazole, polycarbonate, polyphenyl-sulfide, polyamide, polyester) | |
| RUBBERS | |
| Natural | |
| Mix of 30% styrene + 70% Butadiene | |
| Nitriles and acrylo-nitriles | |
| Butyl | |
| Polychloroprene | 0-15 |
| Chlorobutyl | |
| Ethylene propylene terpolymer | |
| Polyolefin | |
| Regenerated | |
| Pulverized scraps | |
| ACCELERATORS, VULCANIZATION AGENTS | |
| Sulfur | |
| Zinc oxide | |
| Magnesium oxide | |
| Mercaptobenzothiazole sulfide | 1-8 |
| Cumates | |
| Altax | |
| Cobalt naphthenate | |
| Hexamethymenetetramine | |
| BARIUM SULPHATE | |
| (Barites) | 10-30 |
| METALS & ALLOYS | |
| Lead | |
| Copper, zinc, aluminum, brass | |
| Antimony, tin | 0-25 |
| Bismuth | |
| Iron powder, cast iron powder | |
| Steel wool | |
| METALLIC BY-PRODUCTS | |
| Litharge, galena | 10-30 |
| Lead silicate | |
| Lead carbonate | |
| Copper sulfides | |
| Copper oxide | |
| Antimony sulfide | |
| Molybdenum sulfide | |
| Iron oxides | |
| Iron sulfide | |
| Zinc sulfide | |
| Aluminum oxide | |
| Chromium oxide | |
| Titanium oxide | |
| FRICTION MODIFIERS AGENTS | |
| Organics | |
| Resins from cashew nut oil, modified or not | 0-10 |
| Graphite | |
| Inorganics | |
| Silica | |
| Aluminum oxides | |
| Cyanites | |
| Rottenstone | |
| Chromium oxides | 0-6 |
| Scories | |
| Glass balls | |
| Zirconium silicate | |
| MISCELLANEOUS | |
| Calcium aluminate | |
| Potassium bichromate | |
| Anti-oxidizings (agerite) | |

-continued

| BASIC COMPONENTS | % BY WT. |
|---|---|
| Carbon black | |
| Wood flour | 5-20 |
| Petroleum coke | |
| Lime | |
| Coal | |
| Chalk, kaolin, marble powder | |
| Clays | |
| Talc | |
| Lead formiate | |
| SOLVENTS | |
| Water | |
| Aromatics | |
| Aliphatics | 0-10 |
| Chlorinated | |
| Alcohols | |
| Ketones | |

For backplates we are using mixes of organic materials with the following composition:

| | % BY WT. |
|---|---|
| FIBERS | |
| Asbestos 7D - 5K - 5R | 10-60 |
| Glass, silica, boron and ceramic fibers | |
| Graphite and carbon fibers | |
| Chopped asbestos cloth, asbestos threads (single or multiple) | |
| Metallic fibers | |
| Textile fibers (natural or synthetic) | |
| RESINS | |
| Formophenolic resins, modified or unmodified from straight phenol or substituted phenols | 5-40 |
| Formol urea, melamines, other nitrogenous resins | |
| Resins from aldehydes other than formol (furfural, benzaldehyde, croton-aldehyde)... | |
| Thermostable resins other than phenolic resins (polyimides, polyesterimides, polyamide-imide, polybenzimidazole, polyphenilsulfide, polycarbonates, polyamides, polyesters)... | |
| RUBBERS | |
| Natural | 0-30 |
| 30% styrene + 70% butadiene | |
| Nitriles and acrylonitriles | |
| Butyl | |
| Polychloroprene | |
| Chlorobutyl | |
| Ethylene propylene terpolymer | |
| Polyolefin | |
| Regenerated | |
| Pulverized scraps | |
| ACCELERATORS, VULCANIZATION AGENTS | |
| Sulfur | 5-10 |
| Hexamethylenetetramine | |
| FILLERS | |
| Lime | 20-50 |
| Chalk | |
| Marble powder | |
| Carbon black | |
| Wood flour | |
| Magnesium stearate | |

EXAMPLES OF MIXES FOR BACKPLATE

| | % BY WT. | | | |
|---|---|---|---|---|
| | 1 | 2 | 3 | 4 |
| 7D Asbestos | 42 | 40 | 16 | |
| Chopped asbestos cloth | | | | 60 |
| Resin | 8 | 8 | 36 | 30 |
| 30% styrene + 70% butadiene | 13.7 | 13.7 | | |

EXAMPLES OF MIXES FOR BACKPLATE -continued

| | % BY WT. | | | |
|---|---|---|---|---|
| | 1 | 2 | 3 | 4 |
| Hexamethylenetetramine | | | 7 | |
| Sulfur | 3.8 | 3.8 | | |
| Natural chalk (blanc de champagne) | 24 | 21 | | |
| Carbon black | | 5 | | |
| Zylene solvent | 8.5 | 8.5 | | 10 |
| Wood flour | | | 34 | |
| Magnesium stearate | | | 1 | |
| Magnesium oxide | | | 2 | |
| Graphite | | | 4 | |

It is to be noted that in the above-indicated compositions, the resins used in the friction material and in the organic backplate must be the same to secure a complete binding between both materials.

Various modifications can be made by one skilled in the art to the invention described above without departing from the spirit thereof.

What is claimed is:

1. A disc brake pad comprising an organic friction material layer and an organic backplate material layer integral therewith, characterized in that the backplate layer is an unbaked preform of compacted pulverulent material, the friction layer is an unbaked preform of compacted pulverulent material, each preform containing the same resin binder, and the brake pad is formed by placing both preforms in a mold and simultaneously applying heat and pressure to join the preforms into an integral disc brake pad.

2. The disc brake pad of claim 1, further characterized by the backplate preform being formed by cold compression of the pulverulent material at a pressure of 80-150 bars.

3. The disc brake pad of claim 1, further characterized by the backplate preform being composed of a pulverulent mix containing 10-60% fiber, 5-40% resin, 0-30% rubber, 5-10% accelerator and vulcanization agents and 20-50% filler.

4. The disc brake pad of claim 2, further characterized by the friction material preform being composed of a pulverulent mix containing 20-60% fiber, 0-15% resin, 0-15% rubber, 1-8% accelerator and vulcanization agents, 10-30% barium sulfate, 0-25% metal and metal alloys, 10-30% metallic by-products, 0-10% organic friction modifiers, 0-6% inorganic friction modifiers, 5-20% fillers and 0-10% solvents.

* * * * *